April 20, 1937.  G. R. BAKER  2,077,979
BISCUIT AND LIKE CUTTING AND EMBOSSING MACHINE
Filed May 26, 1936    9 Sheets-Sheet 1

G. R. Baker
Inventor

By Glascock Downing Seebold
Attys.

April 20, 1937.     G. R. BAKER     2,077,979
BISCUIT AND LIKE CUTTING AND EMBOSSING MACHINE
Filed May 26, 1936     9 Sheets-Sheet 3

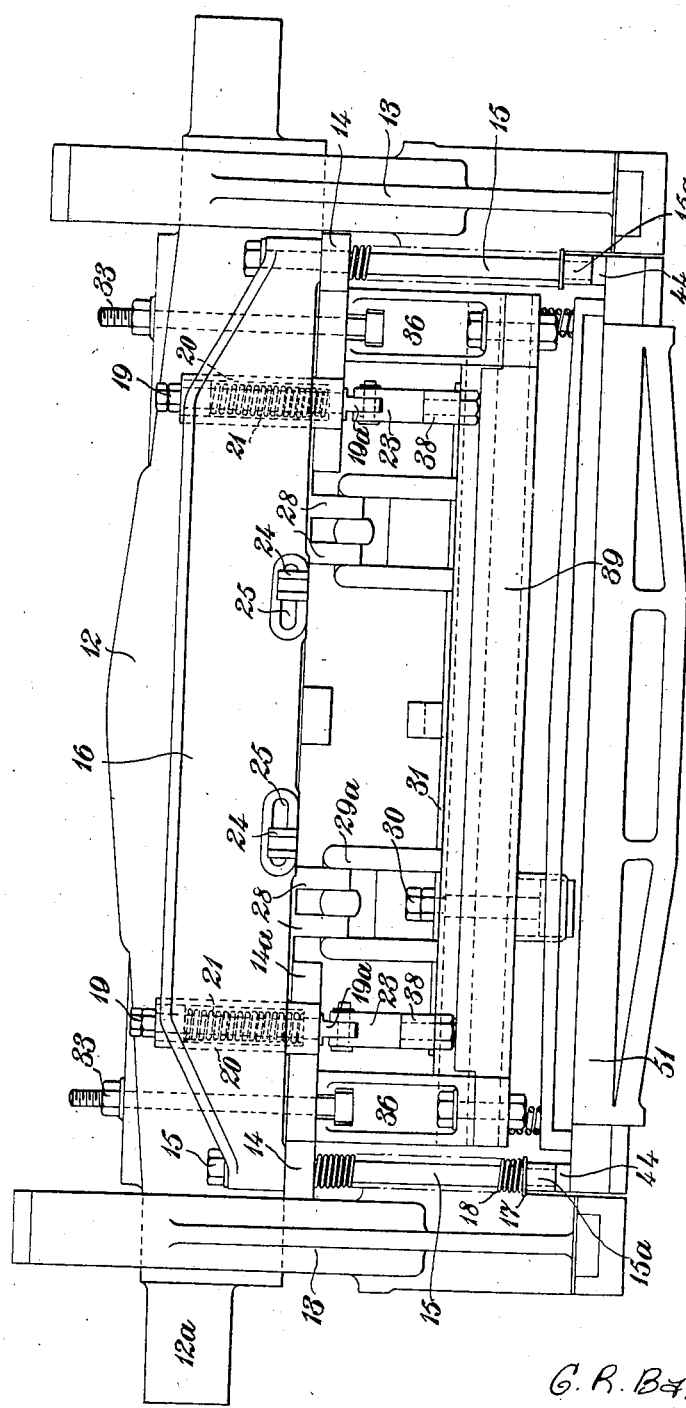

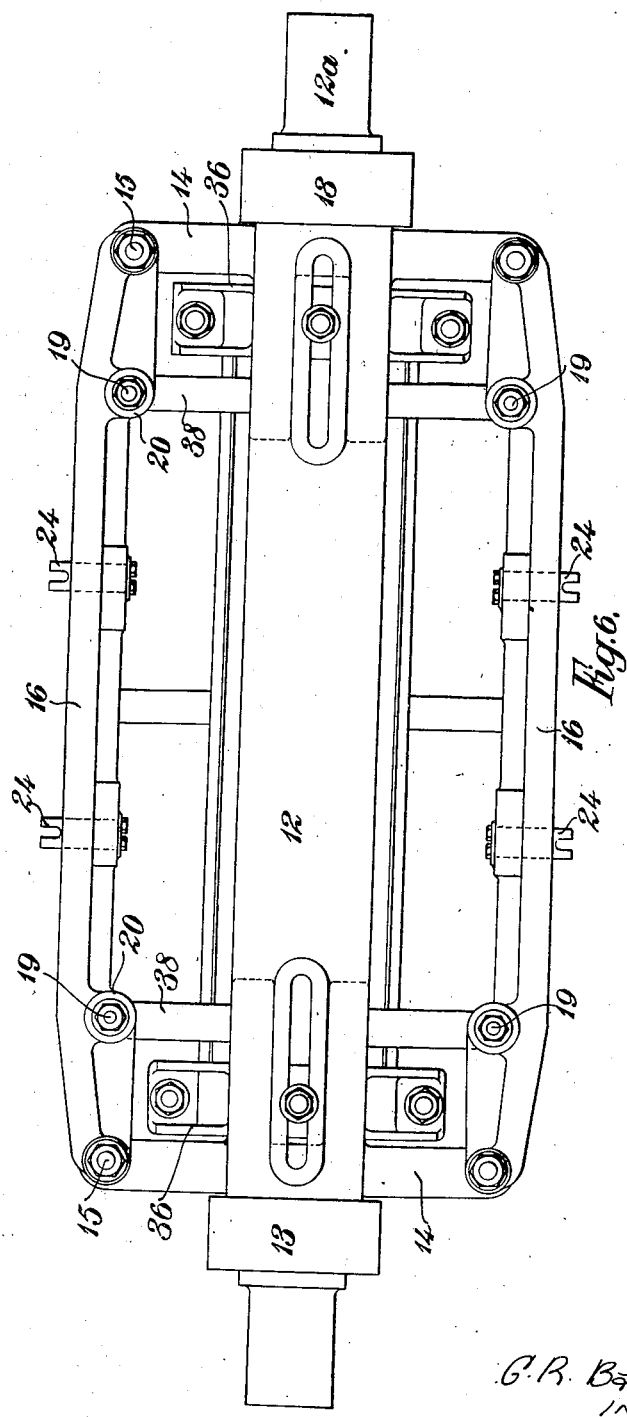

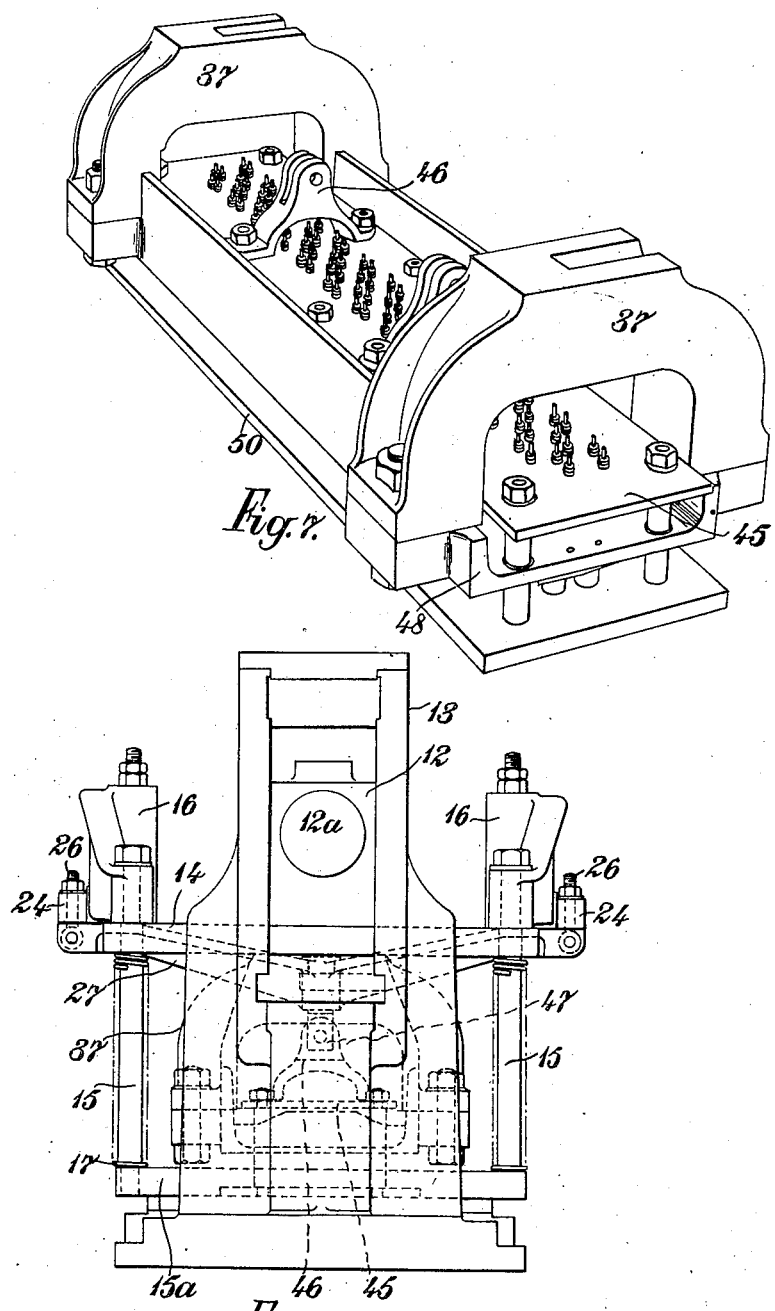

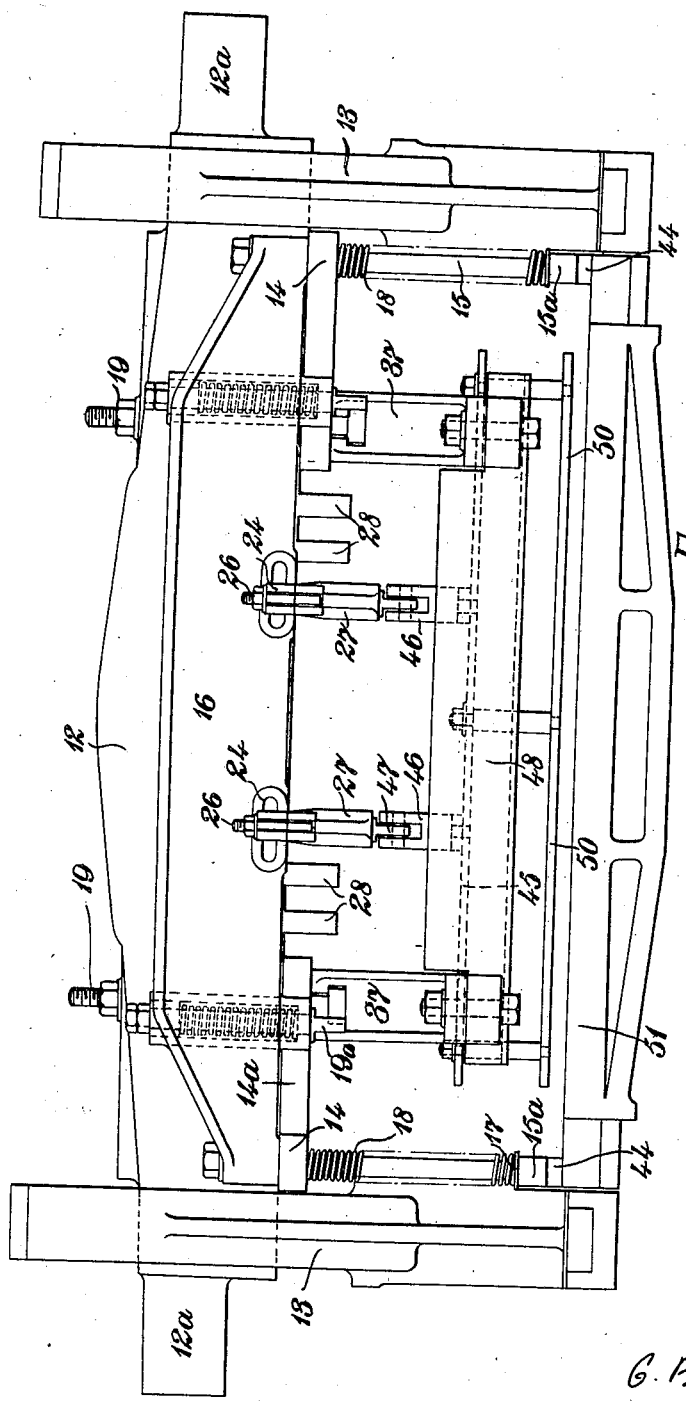

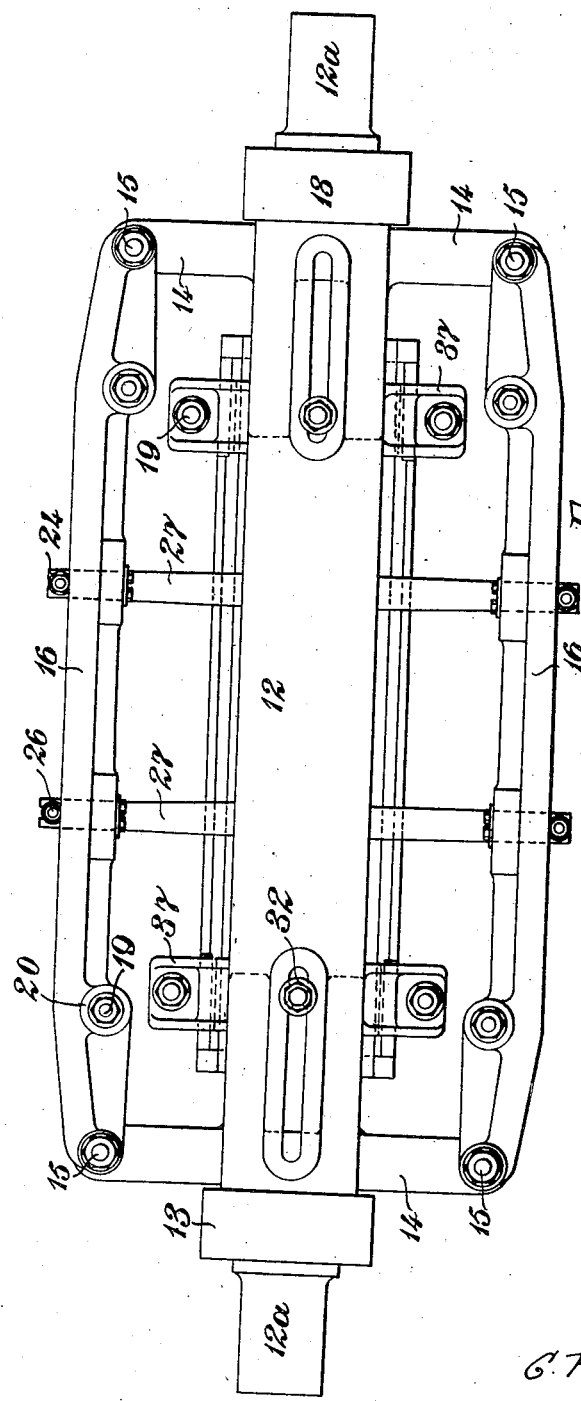

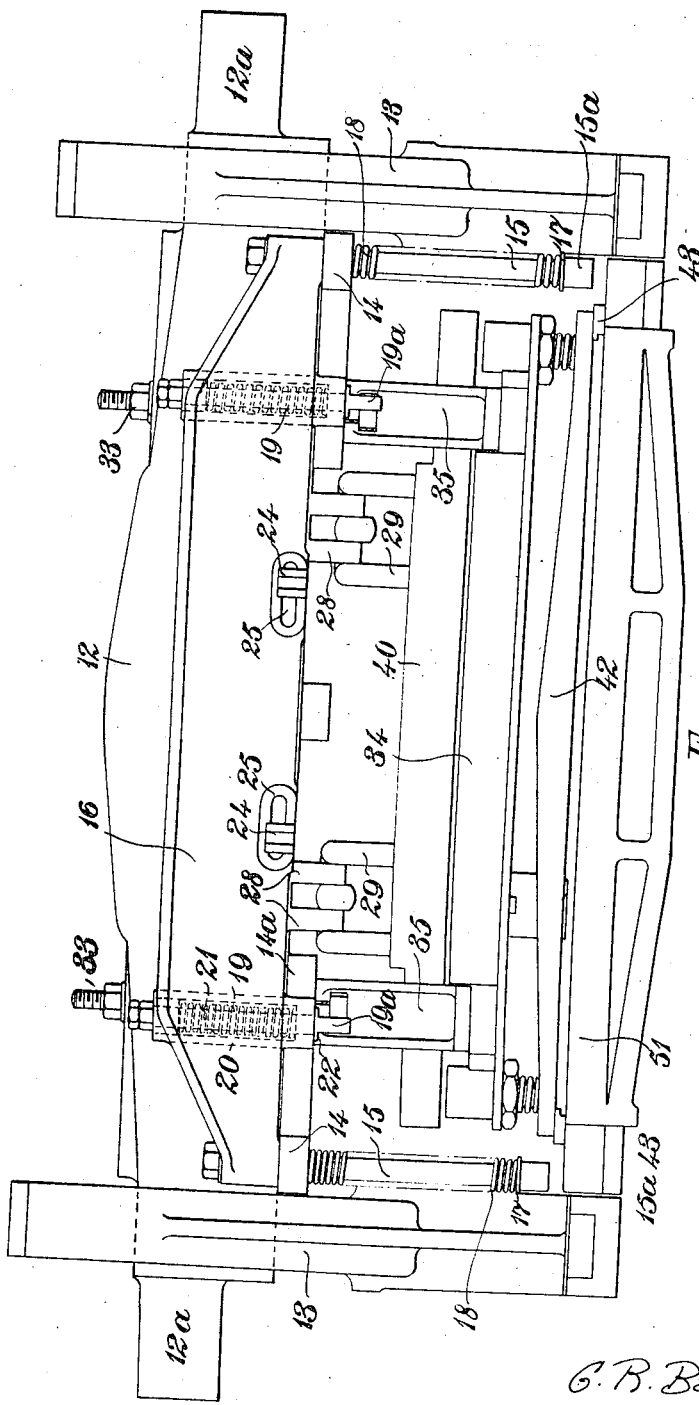

Patented Apr. 20, 1937

2,077,979

UNITED STATES PATENT OFFICE 2,077,979

BISCUIT AND LIKE CUTTING AND EMBOSSING MACHINE

George Ralph Baker, Peterborough, England

Application May 26, 1936, Serial No. 81,957
In Great Britain June 1, 1935

10 Claims. (Cl. 107—24)

This invention relates to biscuit and like cutting and embossing machines of the character in which the cutting and embossing units are attached to a single reciprocating cross head the embossers of which are downwardly impressed by mechanism carried by the cross head and resiliently retracted. In these machines, which are known in the trade as Green embossing and cutting machines, special embossing units have been employed such as, for example, those described in British specifications Nos. 276,391 and 259,903.

For convenience hereinafter these special embossing cutter units will be referred to as the "Green units".

The object of the present invention is to provide means whereby a cutting and embossing machine of the character indicated can also be used with embossing cutter units of a kind intended to be employed in other types of cutting and embossing machine where, for example, two cross heads are employed, one a cutting cross head operated by eccentrics or cranks, and a cam-operated embossing cross head, the cutters of the embossing cutter unit being carried by the cutting cross head while the embossers are attached to the embossing cross head. The embossing and cutting units such as employed in the double cross head machines, may be conveniently referred to hereinafter as "type A units".

A further object of the invention is to provide means whereby a cutting and embossing machine of the kind in question may be used in conjunction with plain cutter units in which the ejectors are attached to a back plate. The back plate of these cutter units which may be called "type B units" is provided with lugs or the like whereby it is usually connected to a weight or spring loaded device adapted to reciprocate in the cutter bar slide bearings, such weight being adapted to rise with the cutter bar in its upward stroke and during the downward stroke of the cutter bar the weight is brought to rest on fixed stops or abutments before the cutter bar completes its downward or cutting stroke so that the ejectors are positioned just clear of the dough being cut and act to eject the cut biscuits from the cutters as the latter rise out of the dough. Type B units in some cases have dockers or type for impressing the dough within the margin of the cutters; and in other cases both dockers and type may be provided.

Accordingly it will be observed that the invention provides that a cutting and embossing machine of the kind first mentioned or the single cross head thereof may be utilized alternatively with the Green units or with those of type A or with type B; or again with the Green or with a unit of type A or type B. Thus the machine may have a universal application and may be used with all units in general use interchangeably.

The invention consists in adaptor means carried by the cutter cross head or by parts associated therewith operable to determine or limit the position of an embosser plate or a back plate with respect to the dough and cutter, the adaptor means preferably comprising a resilient connection by which the cutter cross head acting downwardly holds an embosser or back plate against stops while resilient devices dependent on the cross head may be provided on which an embosser plate is carried for the purpose of resiliently retracting them after a downward embossing operation.

According to one form auxiliary cross heads are connected to the cutter cross head of the machine by resilient means and the auxiliary cross heads are provided with stop pins or the like such that the auxiliary cross heads move up and down with the cutter cross head while the latter is permitted a movement when the stop pins are engaged with stop abutments which may be located on the cutting table. For retracting the embosser plate of type A units, which are operated by the embossing means or shoes on the cutter cross head, the auxiliary cross heads may carry resilient plungers to which the plates are detachably connected. Further, stirrups or like means may be provided for connecting the back plate of type B units to the auxiliary cross heads.

The adaptor means as above described are arranged to afford clearances so that the normal fitting and operation of the Green units to the cutter cross head is not interfered with in any way.

Further features of the invention will hereinafter appear.

In the accompanying drawings:—

Figures 5 and 6 are elevation and plan of a machine with the adaptor means, and a type A unit in position;

Figure 7 is a perspective view of a type B cutting unit.

Figures 8, 9 and 10 are side elevation, plan and elevation of the machine having the improved adaptor means, and with a type B unit in position;

Figure 11 is a side elevation corresponding to Figure 1 but with a "Green" unit in position.

Figure 1:
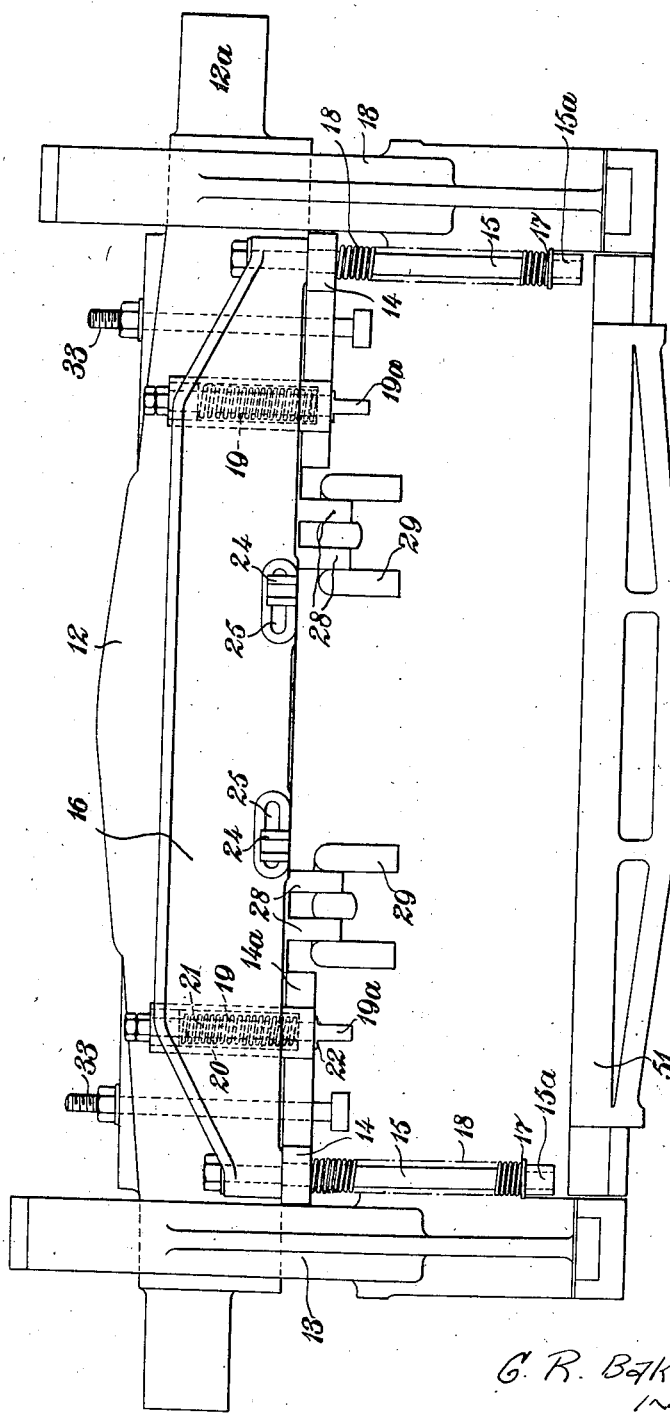
Figure 1 is a side elevation of the main parts of a machine having the improved adaptor means attached.
Figure 2:
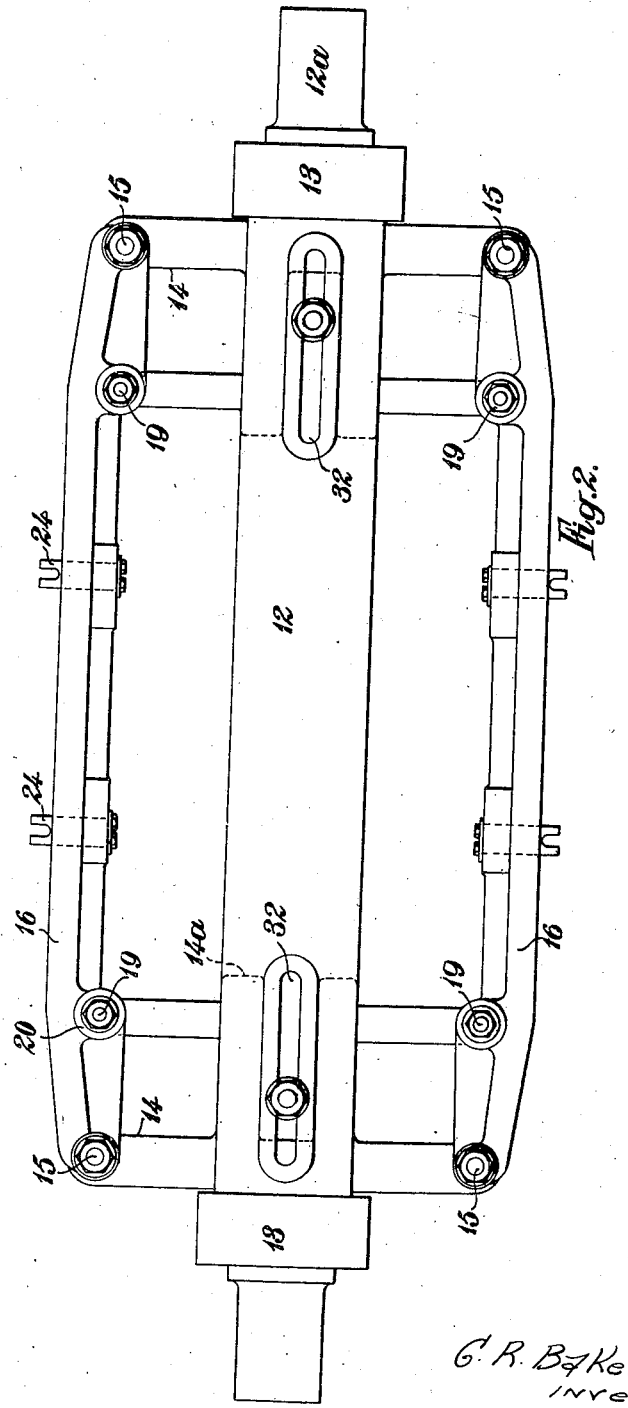
Figure 2 is a corresponding plan.
Figure 3:
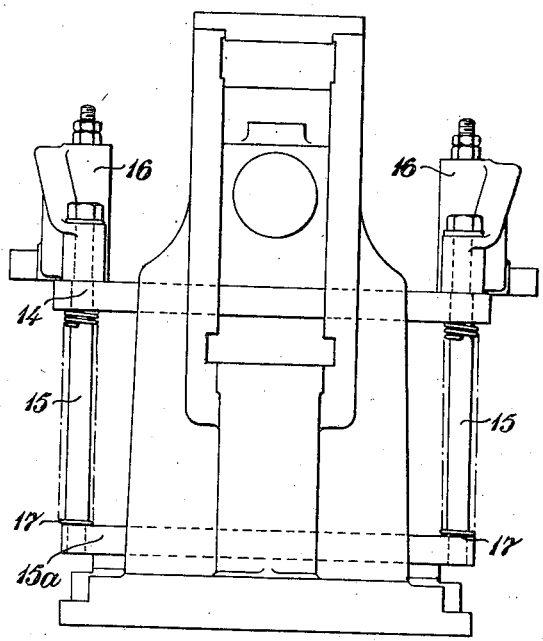
Figure 3 is a corresponding end elevation.

In certain of the above figures the cutter cross head is shown nearly at the lower end of its stroke.

In carrying the invention into effect according to one convenient mode for adapting the embossing cutting machine for using type A or B units alternatively to the Green unit, the single cross head 12 of the machine (hereinafter called "the cutter cross head") has fixed to it adjacent its guides 13 two adaptor arms 14 arranged to project symmetrically on either side of the cutter cross head and at right-angles thereto. Towards the ends of these arms 14, guide apertures are provided through which slide elongated stop pins 15 which are rigidly secured to a pair of adaptor or auxiliary cross heads 16 arranged beside the cutter cross head 12 and parallel thereto. The stop pins 15 have flanges or shoulders 17 towards their lower ends on which abut coil springs 18 located around the pins, the upper ends of the springs bearing against the adaptor arm 14 so that the auxiliary cross heads 16 are resiliently held against the upper side of the arms. At their lower ends the pins 15 are rigidly fixed in cross bars 15a. Removable stops or stop bars 44 (Figures 5 and 8) are provided in association with the cutting table 51 with which the cross bars 15a can engage to limit the downward movement of the auxiliary cross heads 16 and determine their position and that of the embossing or back plate connected thereto. It will be appreciated that the auxiliary cross heads 16 will reciprocate with the cutter cross head 12 on the downward stroke of the latter. When the ends of the pins 15 engage the stops or stop bars 44, the movement of the auxiliary cross heads will be arrested and their position determined, while relative movement between the adaptor arms 14 and the auxiliary cross heads 16 will take place with the compression of the stop pin springs 18 as the cutter cross head 12 is moved further down to complete the operative stroke.

Figure 4:
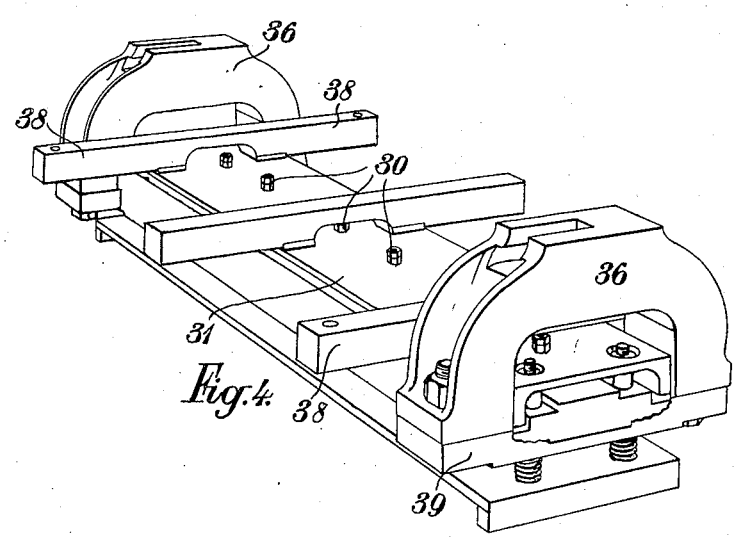
Figure 4 is a perspective view of a type A cutting and embossing unit.

On each auxiliary cross head 16 and spaced between the stop pins 15 is a pair of spring pressed plungers or bolts 19 which are slidingly mounted in recesses or elongated cups 20, the springs 21 normally tending to thrust the bolts upwardly against stops or flanges 22 thereon. The lower ends of the plungers or bolts 19 have apertured lugs 19a or other connecting means for shackles 23 (Figure 5) for securing embosser plates 31 (Figures 4 and 5) of the kind employed in the type A units to the spring plungers. On each auxiliary cross head 16 and on the outer side thereof and between the spring pressed plungers 19, is an adjustable pair of slotted lugs 24 which, for example, may be secured in horizontal slots 25 in the cross heads 16. These slotted lugs 24 are adapted to accommodate pivoted or hinged bolts 26 (Figures 8–10) or other securing means for attaching a pair of parallel stirrups 27 which lie as bridge pieces under and between the auxiliary cross heads in supporting the back plates 45 of type B units (see Figure 7).

The cutter cross head 12 of the embossing cutter machines in question has guide lugs 28 for shoes 29 (see Figures 1 and 11) which are operated by toggle mechanism (not shown) for downwardly pressing the shoes to bear upon and actuate the embosser plates of the Green units whilst the shoe operating mechanism permits the embossers to be retracted under resilient action. The shoes are removable and where type B units are employed (see Figure 8) may be detached as they are not required for operation. With type A units the embosser plates according to the present invention are adapted to be actuated by shoes and for this purpose shoes 29a (Figure 5) deeper than normally required are substituted for the shoes 29, the deeper shoes 29a accommodating the bolt heads or nuts 30 securing the embossers to the plate 31. The deeper shoes are necessary to avoid the guides 28 fouling the bolts 30. The cutter cross head 12 also has longitudinal slots 32 in which adjustably reside T-headed bolts 33 for securing the Green unit in position by bolting up the cutter frame 34 by means of yoke pieces 35. These adjustable bolts also serve for interchangeably securing the cutter frame of each of the units of type A or B by their respective yoke pieces 36 and 37 (see Figures 4–6). It will be noted that by reason of the deeper shoes 29a which are used with type A unit, the cross head 12 is in effect raised so that packing pieces will be required between the yokes 36 and the lower face of the cross head 12.

Conveniently packing pieces 14a are formed integrally with the adaptor arms 14. These pieces 14a are utilized for bolting the arms 14 to the cross head 12.

As a consequence of this adjustment, it will become necessary to lengthen the connecting rods which depend from the trunnion 12a and by which the cutter cross head is reciprocated. Moreover, as a consequence of these adjustments, the shoes 29 when using the Green units will be lengthened an amount equal to the packing pieces 14a and the increase in the length of the connecting rods.

The embosser plates 31 of type A units have apertured lugs 38 on the sides of each end of the plate by which the plate is normally bolted to an embossing bar of an embossing cutter machine of the kind having two cross heads as referred to above, whilst the cutter block or frame 39 is bolted to a cutter bar by the yokes 36. In employing type A units in the present machine the embosser plate 31 is shackled by the bolt lugs 23 to the apertured ends of the spring pressed plungers 19 carried by the auxiliary cross bars 16.

When employing the Green units (see Figure 11) the cutter frame 34 is bolted in the usual manner to the cutter cross head 12 and the spring pressed plungers 19 of the auxiliary cross bar are not utilized. The embossing shoes 29, which as stated above are deeper than usual by the thickness of the packing pieces 14a, bear upon the embossing plate 40 in the normal manner and the embossing plate is spring retracted by the action of the springs between the scrap plate 42 and the embossing plate. Consequently, the stop pins 15 with their coil springs 18 do not come into operation and no stops under the pins are required, the usual stops 43 being present for the scrap or stripper plate 42.

When a type A unit is to be used or interchanged in the machine (see Figures 4, 5 and 6), the cutter block or frame 39 is bolted by means of the usual adjustable bolts 33 referred to above, and the yokes 36 to the cutter cross head 12 of the machine. The embossing shoes 29 of the machine are replaced by the deeper shoes 29a so that the embosser plate 31 may be shoe-operated from the cutter cross head mechanism (not shown).

Stops or stop bars 44 are positioned under the cross bars 15a of the stop pins 15 so that as the cutter cross head 12 descends, the descent of the auxiliary cross heads 16 is arrested by the engagement of the cross bars 15a with the stops 44 (this position being shown in Figure 5) allowing a certain amount of relative movement to take place between the adaptor arms 14 and the auxiliary cross heads 16 as the cutters continue downward to complete their operation, while on the upstroke the cutter cross head picks up the auxiliary cross heads and carries them with it as the upper surfaces of the adaptor arms 14 engage the under surfaces of the auxiliary cross heads 16, according to the stroke of the cutter cross head.

The embosser shoes 29a on their downward movement depress the embosser plate 31 and press the embossers into operative contact with the dough whilst the embosser plate and embossers are sharply retracted after operation by the springs 21 of the spring pressed plungers 19 carried by the auxiliary cross heads which are meanwhile maintained in position by the stop pin springs 18 holding the stop cross bar 15a against the stops 44.

In employing the type B units on the machine (see Figures 7-10), the back plate 45 is secured to the stirrup or bridge pieces 27 referred to above through yokes 46 and connecting links 47. The stirrups 27 are in turn coupled by the hinge pins 26 to the slotted lugs 24 adjusted in the slots 25 in the side of the auxiliary cross heads 16. The cutter frame 48 is secured in position to the cutter cross head 12 by the cutter cross head bolts 33 referred to above through the yokes 37. The embossing shoes 29 in this case do not come into operation and may be removed, nor do the spring pressed plungers 19 function. The cutters reciprocate with the cutter cross head 12 and the adaptor arms 14 carry the auxiliary cross heads 16 and stop pins 15 downward until the pin cross bars 15a engage stops or stop bars 44, when the coil springs 18 around the stop pins are compressed as the cutters enter the dough.

The auxiliary cross heads 16 and the attached back plate 45 remain stationary and stripping and ejecting is effected as the cutters are retracted through the stripper plate 50 and internal ejectors on the return stroke of the cutter cross head with the cutters.

It will be appreciated that the adaptor means according to the invention as above described may be constructed so as to receive in addition to the Green unit either a type A unit or a unit of the type B, or the construction may be such as to receive alternatively type A units and type B units.

Having now described my invention, what I claim as new and desire to secure by Letters Patent is:—

1. In a biscuit embossing and cutting machine having a cutter cross head which carries the embosser actuating mechanism, adaptor means comprising an auxiliary cross head resiliently mounted upon the cutter cross head and acted upon thereby as the latter moves downwardly to hold the auxiliary cross head against stops, said auxiliary cross head having means for resiliently supporting the embosser plate of a cutting and embossing unit whereby the plate is retracted after a downward embossing operation by said embosser actuating mechanism.

2. In a biscuit embossing and cutting machine having a cutter cross head which carries the embosser actuating mechanism, adaptor means comprising an auxiliary cross head resiliently mounted upon the cutter cross head and acted upon thereby as the latter moves downwardly to hold the auxiliary cross head against stops, said auxiliary cross head having means for rigidly supporting the back plate attached to the stripper plate of a cutter unit whereby the stripper plate is maintained in position until the cutters are retracted through the stripper plate.

3. Adaptor means for use in a biscuit embossing and cutting machine having a cutter cross head which carries the embosser actuating mechanism, said adaptor means comprising an auxiliary cross head, means for resiliently supporting the auxiliary cross head from the cutter cross head and to limit the downward movement of the auxiliary cross head, and means for resiliently supporting the embosser plate of an embossing and cutting unit upon the auxiliary cross head and to retract the plate after a downward embossing operation by said embosser actuating mechanism.

4. Adaptor means for use in a biscuit embossing and cutting machine having a cutter cross head which carries the embosser actuating mechanism, said adaptor means comprising an auxiliary cross head, means for resiliently supporting the auxiliary cross head from the cutter cross head and to limit the downward movement of the auxiliary cross head, and means for rigidly supporting the back plate attached to the stripper plate of a cutter unit whereby the stripper plate is maintained in position until the cutters are retracted through the stripper plate.

5. Adaptor means for use in a biscuit embossing and cutting machine having a cutter cross head which carries the embosser actuating mechanism, said adaptor means comprising an auxiliary cross head, means for resiliently supporting the auxiliary cross head from the cutter cross head and to limit the downward movement of the auxiliary cross head, means for resiliently supporting the embosser plate of an embossing and cutting unit and to retract the plate after a downward embossing operation by said embosser actuating mechanism, and means for rigidly supporting the back plate attached to the stripper plate of a cutter unit whereby the stripper plate is maintained in position until the cutters are retracted through the stripper plate.

6. Adaptor means for use in a biscuit embossing and cutting machine having a cutter cross head which carries the embosser actuating mechanism, said adaptor means comprising a pair of adaptor arms adapted to be rigidly secured to the cutter cross head adjacent the guides thereof and extending transversely thereto, said bars having apertures in their ends, a pair of auxiliary cross heads carrying pins extending downwardly through said apertures, springs surrounding the pins and acting to resiliently seat the auxiliary cross heads on the adaptor arms, each auxiliary cross head having a pair of spring pressed plungers located inwardly of said pins and extending downwardly, said plungers having means for coupling them to the embosser plate of an embossing and cutting unit.

7. Adaptor means for use in a biscuit embossing and cutting machine having a cutter cross head which carries the embosser actuating mechanism, said adaptor means comprising a pair of adaptor arms adapted to be rigidly secured to the cutter cross head adjacent the guides thereof and extending transversely thereto, said bars having apertures in their ends, a pair of auxiliary cross heads carrying pins extending downwardly through said apertures, springs surrounding the pins and acting to resiliently seat the auxiliary cross heads on the adaptor arms, each auxiliary cross head having a pair of adjustable fastening means located inwardly of the pins and adapted for rigidly securing transverse stirrup pieces to the auxiliary cross heads, said stirrup pieces being adapted to be coupled to the back plate of a cutter and stripper unit.

8. Adaptor means for use in a biscuit embossing and cutting machine having a cutter cross head which carries the embossing actuating mechanism, said adaptor means comprising a pair of adaptor arms adapted to be rigidly secured to the cutter cross head adjacent the guides thereof and extending transversely thereto, said arms having apertures in their ends, a pair of auxiliary cross heads carrying pins extending downwardly through said apertures, springs surrounding the pins and acting to resiliently seat the auxiliary cross heads on the adaptor arms, each auxiliary cross head having a pair of spring pressed plungers located inwardly of said pins and extending downwardly, said plungers having means for coupling them to the embosser plate of an embossing and cutting unit, each auxiliary cross head also having a pair of adjustable fastening means located inwardly of the spring pressed plungers, said fastening means being adapted to secure transverse stirrup pieces to the auxiliary cross heads, said stirrup pieces being adapted to be coupled to the back plate of a cutter and stripper unit.

9. Adaptor means as claimed in claim 8 wherein the adaptor arms are provided with lateral extensions forming seating surfaces for the yoke pieces of the cutter plate of said units.

10. Adaptor means for use in biscuit embossing and cutting machines having a cutter cross head which carries the embosser actuating mechanism, said adaptor means comprising a pair of spaced auxiliary cross heads arranged parallel to one another, pins fixed to the ends of the auxiliary cross heads and extending downwardly, a pair of adaptor arms having apertures at the ends through which said pins pass, collars fixed to the lower end of the pins, springs surrounding the pins and abutting said arms at one end and the collars at the other, a pair of cross bars arranged transversely to the auxiliary cross heads and fixed to the lower ends of the pins, said auxiliary cross heads having pairs of recesses located inwardly of the pins, spring plungers located in said recesses and extending beneath the lower faces of the auxiliary bars, said auxiliary cross bars having pairs of horizontally arranged slots located within the spring plunger recesses, and slotted supporting elements located in said slots and adjustable longitudinally of said auxiliary cross bars.

GEORGE RALPH BAKER.